(12) United States Patent
Aradachi et al.

(10) Patent No.: US 8,013,575 B2
(45) Date of Patent: Sep. 6, 2011

(54) CHARGING DEVICE HAVING PROTECTIVE SWITCHING ELEMENT

(75) Inventors: Takao Aradachi, Ibaraki (JP);
Kazuhiko Funabashi, Ibaraki (JP);
Shinji Watanabe, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 192 days.

(21) Appl. No.: 12/020,968

(22) Filed: Jan. 28, 2008

(65) Prior Publication Data
US 2008/0180065 A1 Jul. 31, 2008

(30) Foreign Application Priority Data

Jan. 29, 2007 (JP) ............... P2007-017613

(51) Int. Cl.
*H02J 7/02* (2006.01)
(52) U.S. Cl. .......... 320/128; 320/152; 320/163
(58) Field of Classification Search .......... 320/152, 320/163, 128
See application file for complete search history.

(56) References Cited

U.S. PATENT DOCUMENTS

| | | | | |
|---|---|---|---|---|
| 4,061,956 A | * | 12/1977 | Brown et al. ......... | 320/153 |
| 5,206,578 A | * | 4/1993 | Nor ............... | 320/118 |
| 5,530,336 A | * | 6/1996 | Eguchi et al. ........ | 320/118 |
| 5,576,612 A | * | 11/1996 | Garrett et al. ........ | 320/106 |
| 5,644,211 A | * | 7/1997 | Tokuyama ........... | 320/162 |
| 5,677,615 A | * | 10/1997 | Takano et al. ........ | 320/152 |
| 5,691,622 A | * | 11/1997 | Mack et al. ......... | 320/134 |
| 7,196,911 B2 | * | 3/2007 | Takano et al. ....... | 363/21.01 |
| 2004/0075417 A1 | * | 4/2004 | Aradachi et al. ....... | 320/107 |
| 2004/0135548 A1 | * | 7/2004 | Takano et al. ........ | 320/132 |
| 2005/0013144 A1 | * | 1/2005 | Takano et al. ....... | 363/21.01 |
| 2009/0108804 A1 | * | 4/2009 | Aradachi et al. ....... | 320/106 |

FOREIGN PATENT DOCUMENTS

| | | |
|---|---|---|
| JP | 06-141479 | 5/1994 |
| JP | 2004-187366 | 7/2004 |
| JP | 2005-312298 | 11/2005 |

OTHER PUBLICATIONS

Japanese Office Action, with English translation, issued in Japanese Patent Application No. 2007-017613, mailed Feb. 24, 2010.

* cited by examiner

*Primary Examiner* — Edward Tso
*Assistant Examiner* — Manuel Hernandez
(74) *Attorney, Agent, or Firm* — McDermott Will & Emery LLP

(57) ABSTRACT

To prevent a battery pack from being over-discharged even under a state that the battery pack (a secondary battery) is connected to a discharging device that is not connected to an ac input power source for a long time. A charging device has a pair of output lines and an anode terminal and a cathode terminal of a secondary battery electrically connected between the output lines to carry out a charging operation. In the charging device including a component circuit part electrically connected by traversing a part between the pair of output lines, a switching element is inserted between the component circuit part and one of the pair of output lines. When the charging device is not connected to an input power source, the switching element is allowed to be non-conductive to interrupt a discharging path so that the component circuit part does not form the discharging path.

21 Claims, 4 Drawing Sheets

CHARGING DEVICE HAVING PROTECTIVE SWITCHING ELEMENT

CROSS-REFERENCE TO RELATED APPLICATIONS

This application is based on and claims the benefit of priority from the prior Japanese Patent Application No. 2007-017613, filed on Jan. 29, 2007; the entire contents of which are incorporated herein by reference.

BACKGROUND OF THE INVENTION

1. Technical Field

The present invention relates to a charging device for charging a secondary battery such a lithium ion secondary battery, and more particularly to a charging device having a protecting switching element for interrupting an unnecessary discharging path formed to a charging secondary battery connected to an output line of the charging device.

2. Background Art

As a power source for driving an electric cordless tool, a secondary battery whose capacity is relatively increased such as a nickel hydrogen battery or a nickel cadmium battery is used. As a high capacity and light secondary battery, a lithium ion battery has been put to practical use. The lithium ion battery has features that a nominal voltage of the lithium ion battery is relatively higher than that of the nickel hydrogen battery or the nickel cadmium battery and compact and light. Further, the lithium ion battery has features that the lithium ion battery is good in its discharging efficiency, can discharge even in an environment of relatively low temperature and can obtain a stable voltage within a wide temperature range.

On the other hand, in a charging device for charging the secondary battery (a battery pack) such as the nickel hydrogen battery or the lithium ion battery, a device is formed for preventing an unnecessary discharge or charge to ensure the life of the battery. Especially, in the lithium ion battery, since to carry out an over-discharging operation or an over-charging operation may possibly give a damage to the battery, as disclosed in JP-A-6-141479, a protective countermeasure is ordinarily carried out that an exclusive protecting IC or a microcomputer is ordinarily provided in a battery pack to monitor an over-charge or an over-discharge, and when a battery voltage is a prescribed voltage value or lower, or higher, the protecting IC or the microcomputer outputs a control signal to interrupt a charging path or a discharging path of the secondary battery in accordance with the control signal.

Further, for instances as disclosed in JP-A-2004-187366, a charging device is known that a relay switch is inserted into an output line of the charging device and when a charging operation is completed, the relay switch is interrupted to electrically disconnect the secondary battery.

Problems of Conventional Apparatus to be Solved

However, for instance, in a battery pack having a structure that an exclusive protecting IC or a microcomputer is provided for monitoring an over-discharge or an over-charge in a battery pack (a secondary battery) to interrupt a charging path by an interrupting unit provided in a charging device main body or a charging device side in accordance with a signal outputted from the protecting IC or the microcomputer or a battery pack having no special circuit structure, the battery pack that is completely charged or needs to be charged may be possibly sometimes connected to the charging device from which an input power terminal is pulled out from an ac power source and left as it is for a long time.

Under this state that the battery pack is left as it is, since a component circuit part of the charging device such as a resistance provided by traversing a pair of output lines of the charging device forms a discharge circuit to the battery pack, a problem arises that the battery pack is discharged to be over-discharged. Especially, in a lithium ion secondary battery, when the battery is over-discharged, a problem arises that copper in an inner part is precipitated to cause a damage such as a short-circuit between electrodes.

As disclosed in JP-A-2004-187366, the charging device is well known that to interrupt a charging path after the charging operation is finished, the relay switch is provided in the output line of the charging device and when the charging operation is finished, the output line of the charging device is electrically interrupted from an anode terminal or a cathode terminal of a battery pack. According to the relay switch, a discharging path formed by an inner circuit (a component circuit part) of the charging device connected by traversing the output line of the charging device to the relay switch is released from the battery pack after the charging operation is finished, however, a discharging circuit such as a battery voltage detecting circuit connected to an output side (the anode terminal side of the battery pack) of the relay switch cannot be released or interrupted from the battery pack by interrupting the relay switch. Accordingly, the problem of an over-discharge caused when the battery pack is connected to the charging device and left for a long time cannot be adequately solved. Further, the use of the relay switch in the charging device is inconveniently disadvantage in view of production cost.

SUMMARY OF THE INVENTION

Accordingly, it is an object of the present invention to solve the above-described disadvantages of a usual technique and provide a charging device in which a battery pack is not over-discharged even when the battery pack is inserted into the charging device that is not connected to an ac power source and left as it is for a long time.

To solve the above-described problems, typical features disclosed by the present invention will be described below.

According to one feature of the present invention, in a charging device that has a pair of output lines for supplying a charging current or a charging voltage to perform a charging operation by connecting an anode terminal and a cathode terminal of a secondary battery between the pair of output lines, the charging device comprises: a component circuit part of the charging device connected by traversing a part between the pair of output lines and a switching element connected between the component circuit part and one of the pair of output lines. The switching element is allowed to be non-conductive to interrupt a discharging path to the secondary battery formed by the component circuit.

According to another feature of the present invention, the charging device includes a pair of input power terminals to be connected to an ac power source, and the switching element is connected in series to the component circuit part so that the switching element is changed from a conductive state to a non-conductive state when the input power terminals are not connected to the ac power source.

According to a still another feature of the present invention, the switching element is formed with a semiconductor switching element.

According to a still another feature of the present invention, the component circuit part of the charging device is a discharging resistance circuit including a resistance element and the switching element is connected in series to the discharging resistance circuit.

According to a still another feature of the present invention, the component circuit part of the charging device is composed of a plurality of series resistance circuits connected in series and the switching element is connected in series to the series resistance circuits.

According to a still further feature of the present invention, the series resistance circuits form a voltage dividing circuit forming a voltage comparing circuit of a shunt regulator.

According to the present invention, in the charging device having the component circuit part of the charging device that is electrically connected by traversing the pair of output lines for charging the secondary battery (a battery pack), the switching element is electrically connected between the component circuit part and one of the output lines. When the secondary battery is not charged by the pair of output lines, that is, the input power terminal is not connected to the ac power source, the switching element is made to be non-conductive. Thus, since the discharging path formed by the component circuit part is interrupted, even when the secondary battery is inserted into the charging device and left as it is for a long time, the over-discharge of the secondary battery can be prevented.

According to the present invention, since the switching element is formed with the semiconductor switching element, an unnecessary discharge of the secondary battery can be prevented by a relatively inexpensive switching unit.

The above-described object and other objects, the above-described features and other features and advantages will be more apparent from a below-described explanation of this specification and attached drawings.

DETAILED DESCRIPTION OF THE INVENTION

Figure 1:
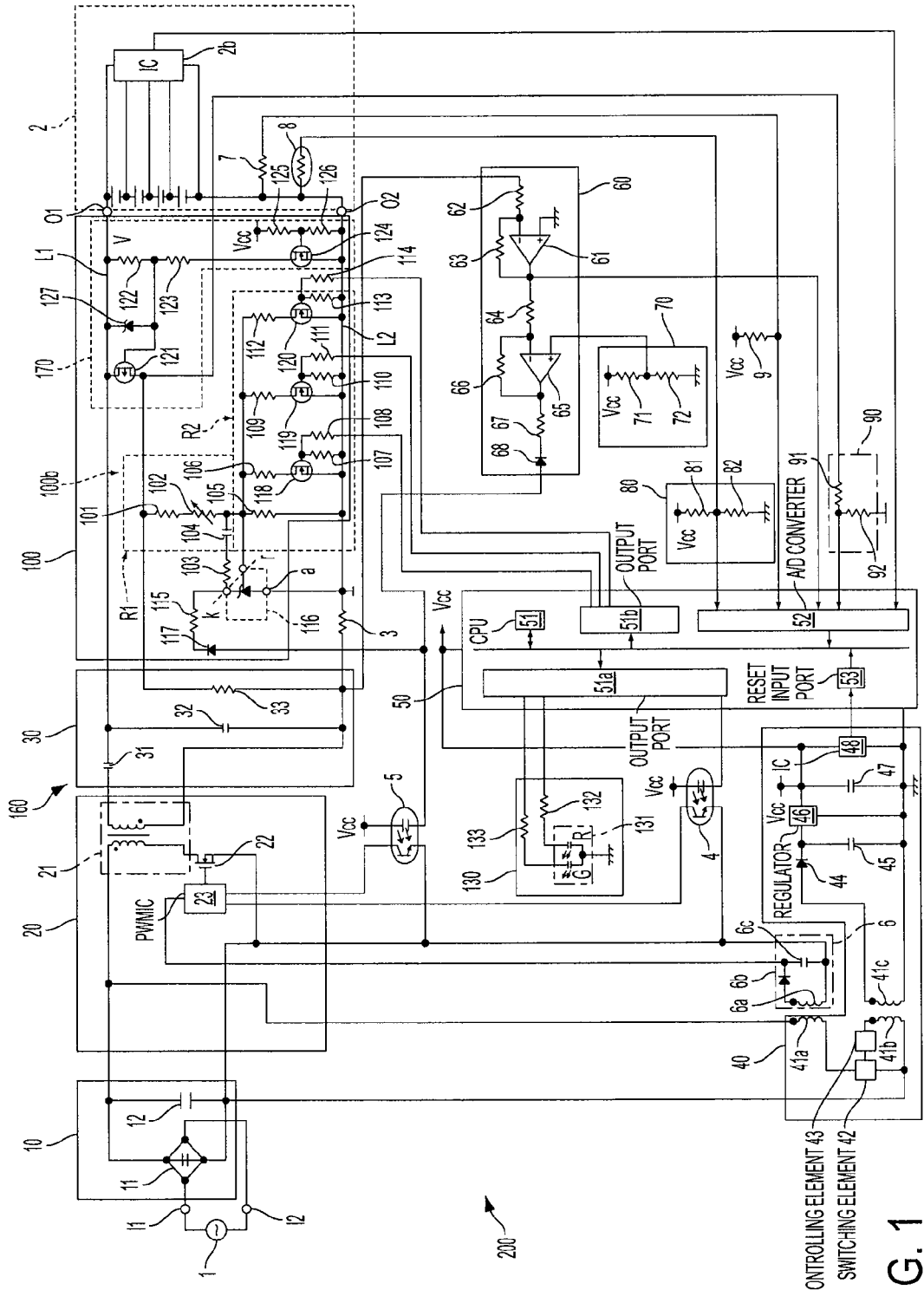
FIG. 1 is a circuit diagram showing one embodiment of a charging device according to the present invention.

Now, an embodiment of the present invention will be described in detail by referring to the drawings.

Figure 2:
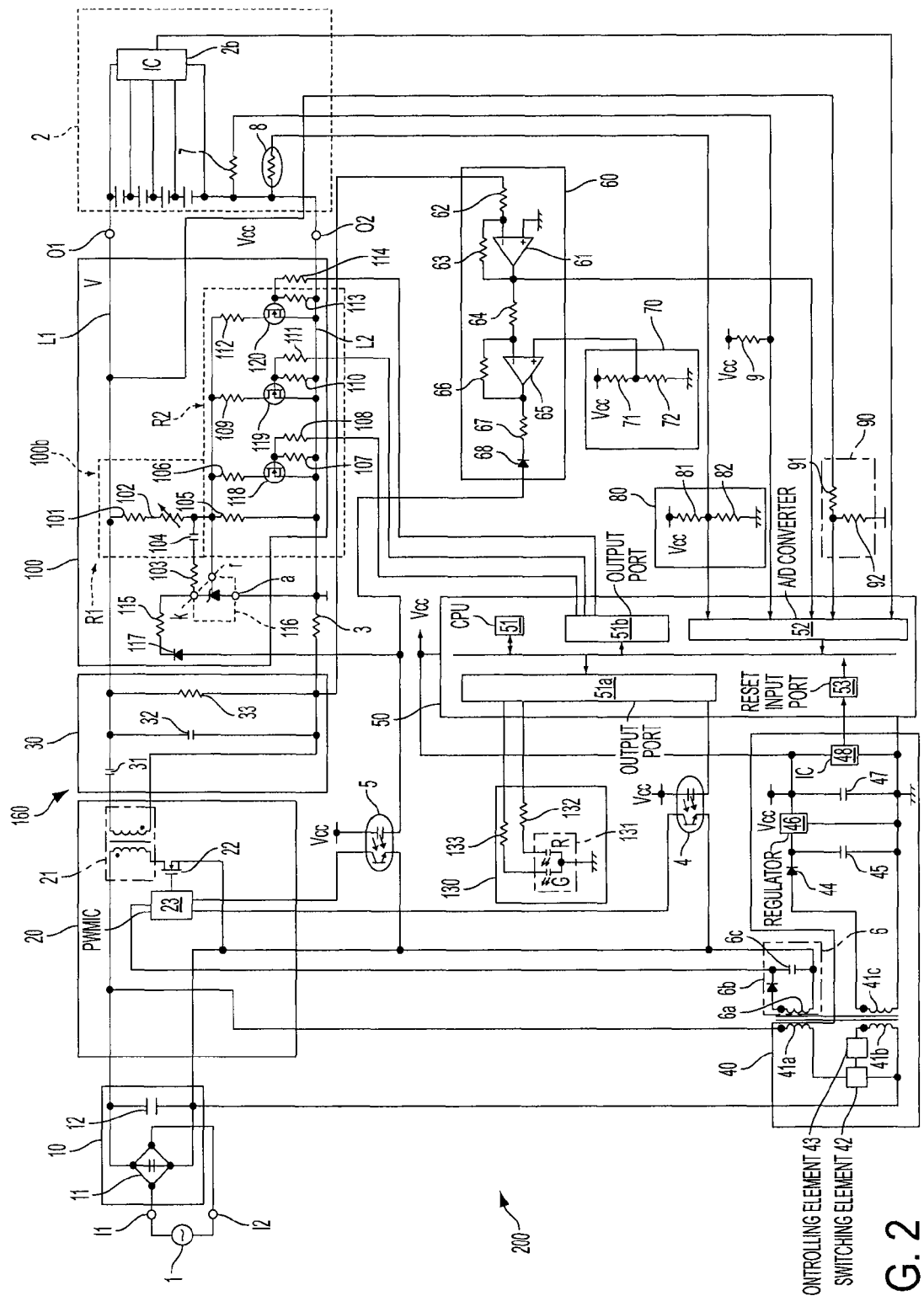
FIG. 2 is a circuit diagram of a charging device considered in the course of studying the charging device of the invention shown in FIG. 1.
Figure 3:
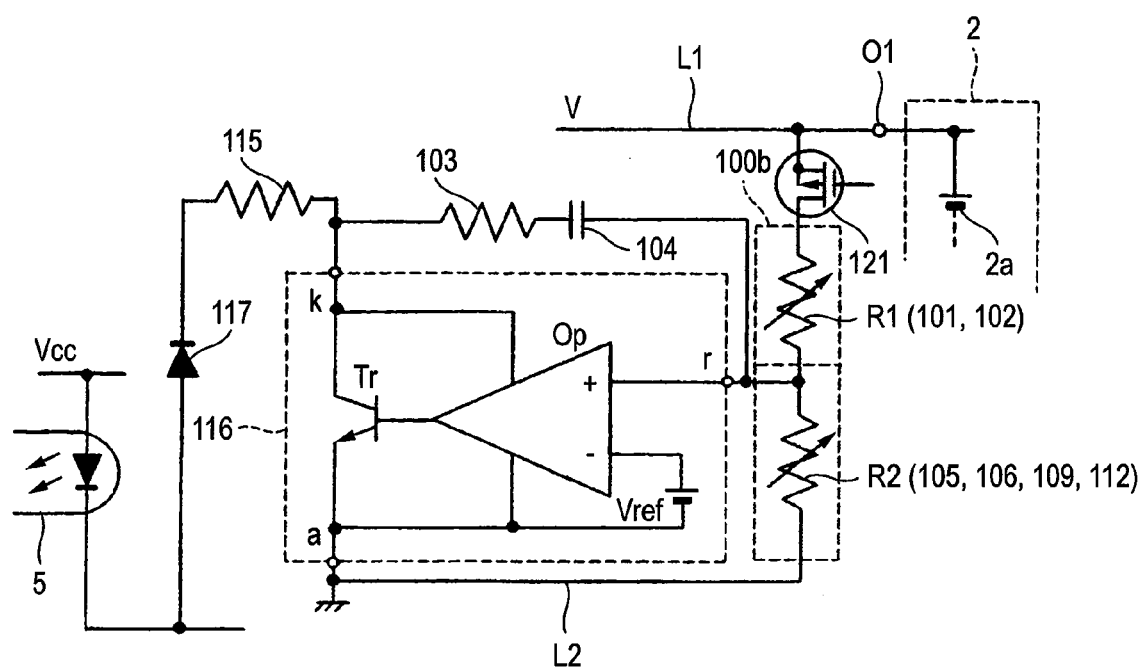
FIG. 3 is an equivalent circuit diagram of a shunt regulator used in the charging device shown in FIG. 1.
Figure 4:
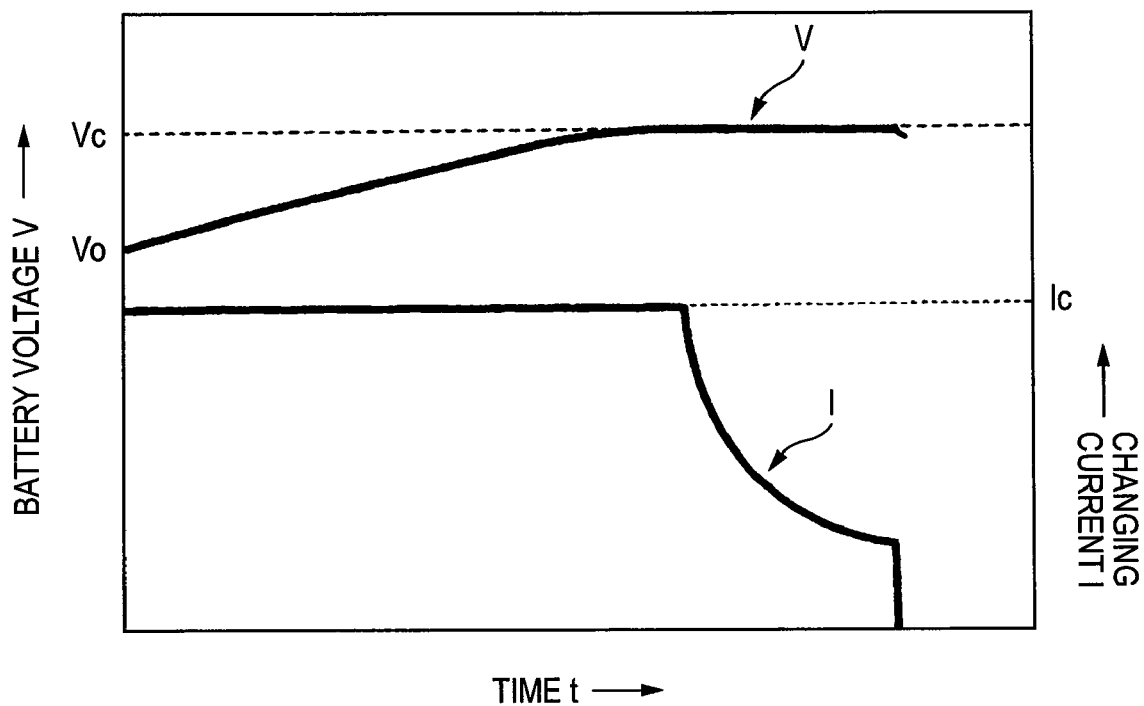
FIG. 4 is a characteristic view showing a time change of a battery voltage and a charging current obtained when a constant current and constant voltage charging operation is carried out by the charging device according to the present invention shown in FIG. 1.

FIG. 1 is a circuit diagram of a charging device 200 provided with a discharge preventing circuit of a secondary battery in a first embodiment of the present invention. FIG. 2 is a circuit diagram of a charging device 200 considered in the course of studying the present invention and shows the charging device to which the discharge preventing circuit according to the present invention is not applied. FIG. 3 is an equivalent circuit diagram of a shunt regulator part used in the charging device shown in FIG. 1. FIG. 4 is a charging characteristic view when a lithium ion secondary battery is charged by the charging device 200 according to the present invention shown in FIG. 1. In the circuit diagrams of FIGS. 1 to 3, members having the same functions are designated by the same reference numerals and a repeated explanation thereof will be omitted.

In FIG. 1, a battery pack (a secondary battery) 2 to be charged by the charging device 200 includes, for instance, a single or a plurality of lithium ion battery cells 2a connected in series that can be charged, a cell number discriminating resistance 7 for discriminating the number of cells of the battery cells 2a connected in series, a heat sensitive element 8 functioning as a temperature detecting sensor such as a thermistor disposed in contact with or closely to the battery cells 2a to detect a battery temperature in the battery pack 2 and a protecting IC 2b for monitoring the voltages of each battery cell 2a and outputting a signal when the protecting IC 2b detects an over-charge or an over-discharge. For instance, in the battery pack 2 of this embodiment, the battery cell 2a is composed of a lithium ion battery of 1 cell (nominal voltage of 3.6 V) and the thermistor is used as the heat sensitive element 8. The cell number discriminating resistance 7 divides a dc voltage source (stabilizing dc voltage) Vcc together with a detecting resistance 9 forming a cell number discriminating circuit to discriminate the number of cells in accordance with a detected voltage. An anode terminal O1 of the battery pack 2 is electrically connected to an output line L1 of the charging device, and a cathode terminal O2 of the battery pack 2 is electrically connected to an output line L2 of the charging device 200, respectively.

The heat sensitive element 8 is connected to a battery temperature detecting circuit 80 including series resistances 81 and 82 to which the dc voltage Vcc is supplied to convert the temperature change of a resistance value into a voltage and inputs the voltage to an A/D converter 52 of a below described microcomputer 50. The anode terminal O1 of the battery pack 2 is connected to a battery voltage detecting circuit 90 composed of a voltage dividing circuit of resistance 91 and 92.

(Charging Power Circuit 160)

A charging power circuit 160 for supplying a charging electric power to the battery pack 2 is formed by a switching power circuit including a primary side rectifying and smoothing circuit 10, a switching circuit 20 having a high frequency transformer 21 and a secondary side rectifying and smoothing circuit 30.

The primary side rectifying and smoothing circuit 10 includes a full-wave rectifying circuit 11 and a smoothing capacitor 12 and is electrically connected to an ac power source 1 such as a commercial ac power source through a pair of input power terminals I1 and I2 to full-wave rectify the ac power source 1. Ordinarily, the input power terminals I1 and I2 are formed with electric plugs so as to be inserted into plug sockets or sockets of the commercial ac power source 1.

The switching circuit 20 includes the high frequency transformer 21, a MOSFET (a switching element) 22 connected in series to a primary winding 21a of the transformer 21 and a PWMIC (a switching control IC) 23 for modulating a pulse width of a driving pulse signal applied to the gate electrode of the MOSFET 22.

A driving power of the PWMIC 23 is supplied from a rectifying and smoothing circuit (a dc power circuit) 6. This dc rectifying and smoothing circuit 6 includes a transformer 6a, a rectifying diode 6b and a smoothing capacitor 6c. To the PWMIC 23, a charging voltage control signal and a charging current control signal are inputted through a charging feedback signal transmitting unit 5 composed of a photo-coupler. Further, to the PWMIC 23, a charging control signal for controlling the start and the stop of a charging operation is inputted through a charging control transmitting unit 4 composed of a photo-coupler.

The PWMIC 23 controls the start and the stop of the charging operation of the MOSFET 22 by the photo-coupler 4 (the charging control transmitting unit) 4 in accordance with a control signal supplied from the microcomputer 50, and changes the driving pulse width supplied to the gate electrode of the MOSFET 22 in accordance with a control signal supplied by the photo-coupler (the charging feedback signal transmitting unit) 5 to control a turning on time of the MOSFET 22 and adjust the output voltage of the secondary side rectifying and smoothing circuit 30 and the charging current of the battery pack 2.

The secondary side rectifying and smoothing circuit 30 includes a rectifying diode 31 connected to a secondary winding 21c of the transformer 21, a smoothing capacitor 32 and a discharging resistance 33. The discharging resistance 33 is directly electrically connected to an output line L1 in the charging device 200 in the course of studying the invention that is shown in FIG. 2. However, in the charging device 200 according to the present invention shown in FIG. 1, as described below, the discharging resistance 33 is connected to the output line L1 through a discharge preventing switching element 121 inserted in accordance with the present invention.

A constant voltage power circuit 40 is provided to supply the stabilizing dc voltage Vcc to various kinds of control circuits (including a detecting circuit) such as the microcomputer 50, operational amplifiers 61, 65 or the like. The constant voltage power circuit 40 includes transformers 41a to 41c, a switching element 42 and a controlling element 43 forming a switching power source, a rectifying diode 44, a three-terminal regulator 46, a smoothing capacitor 45 connected to an input side of the three-terminal regulator 46 and a smoothing capacitor 47 connected to an output side of the three-terminal regulator 46 to output a constant voltage Vcc. To an output side of the constant voltage of the constant voltage power circuit 40, a reset IC 48 is connected for outputting a rest signal when the commercial power source 1 is connected to the charging device 200.

(Control Circuit Device 50)

A control circuit device (the microcomputer) 50 is provided to decide a battery temperature in accordance with an output signal of the battery temperature detecting circuit 80, decide a battery voltage in accordance with an output signal of the battery voltage detecting circuit 90, output the control signal to the charging power circuit 160 and output control signals to a below-described charging current control circuit 160 and a charging voltage control circuit 100. The microcomputer 50 includes a read only memory (ROM), which is not shown in the drawing, for storing a control program of a CPU 51 and data related to kinds of batteries of the battery pack 2 and a random access memory (RAM) used as an operating area of the CPU 51 or a temporary storing area of data as well as the CPU (a central processing unit) 51, and a timer.

Further, the microcomputer 50 includes the A/D converter 52 for converting analog input signals detected by the above-described cell number detecting resistance 9, the battery voltage detecting circuit 90 and the battery temperature detecting circuit 80 into digital signals, an output port 51b for outputting the control signal to the below-described charging voltage control circuit 100, an output port 51a for outputting a control signal of a display circuit 130 and a reset input port 53 for inputting a rest signal of the reset IC 48.

(Charging Current Control Circuit 60 and Charging Current Setting Circuit 70)

The charging current control circuit 60 includes a calculating and amplifying circuit having the operational amplifiers 61 and 65, input resistances 62 and 64 of the operational amplifiers 61 and 65, feedback resistances 63 and 66 of the operational amplifiers 61 and 65 and an output circuit having a diode 68 and a current limiting resistance 67. An input stage of the charging current control circuit 60 is connected to a charging current detecting resistance 3 for detecting the charging current of the battery pack 2. Further, an output stage thereof controls the PWMIC 23 through the charging feedback signal transmitting unit 5 composed of the photo-coupler as described above. To one input terminal (+) of the operational amplifier 65, a charging current setting circuit 70 is connected. On the other hand, an output voltage of the operational amplifier 61 is inputted to the A/D converter 52 to monitor a charging current value and the charging current value is measured by the microcomputer 50. The microcomputer 50 also measures the fall of the charging current value in a fully charged state in accordance with the output of the operational amplifier 61.

The charging current setting circuit 70 is provided to set the charging current to a prescribed charging current value. The charging current setting circuit 70 includes a series resistance circuit (a voltage dividing circuit) of resistances 71 and 72 connected to the stabilizing dc voltage Vcc.

In the charging current control circuit 60, a voltage drop based on the charging current supplied to the charging current detecting resistance 3 is inverted and amplified by the resistances 62, 63 and the operational amplifier 61 and a difference between an output voltage thereof and a setting voltage value (a setting charging signal) corresponding to the charging current value set by the charging current setting circuit 70 is amplified by the operational amplifier 65 functioning as a voltage comparator to apply a feedback to the PWMIC 23 through the charging feedback signal transmitting unit 5 and control the switching operation of the MOSFET 22. That is, when the charging current supplied to the current detecting unit 3 is larger than a prescribed charging current, the MOSFET 22 applies an output pulse whose pulse width is narrowed to the high frequency transformer 21. On the contrary, when the charging current is smaller than the prescribed charging current, the MOSFET 22 applies a pulse whose pulse width is more widened to the high frequency transformer 21. Thus, the secondary side rectifying and smoothing circuit 30 smoothes a voltage to a dc voltage corresponding to the prescribed charging current (a constant current) to set the charging current of the battery pack 2 to the prescribed current set by the charging current setting circuit 70. In other words, the current detecting unit 3, the charging current control circuit 60, the charging feedback signal transmitting unit 5, the switching circuit 20 and the secondary side rectifying and smoothing circuit 30 control the charging current supplied to the battery pack 2 so as to be a setting charging current value set by the charging current setting circuit 70. Further, the charging current control circuit 60 detects the charging current smaller than the setting charging current value.

(Charging Voltage Control Circuit 100)

The charging voltage control circuit 100 is a circuit for controlling the charging voltage of the battery pack 2 and includes a well-known shunt regulator 116 having an anode terminal 1, a cathode terminal k and a reference terminal r and a charging voltage setting circuit 100b connected to the reference terminal r of the shunt regulator 116. An equivalent circuit of the shunt regulator 116 includes, as shown in FIG.

3, an operational amplifier (a voltage comparator) Op, a transistor Tr for a current path, a reference voltage source Vref including a Zener diode.

As shown in FIG. 3, to the reference terminal (a comparing input terminal) r of the shunt regulator 116, a first voltage dividing resistance unit R1 composed of resistances 101 and 102 is connected between the anode terminal O1 of the battery pack 2 and the reference terminal r. Further, a second voltage dividing resistance unit R2 composed of resistances 105, 106, 109 and 112 is connected between the cathode terminal (a ground terminal) O2 of the battery pack 2 and the reference terminal. To the cathode terminal k of the shunt regulator 116, a current limiting resistance 115 and a diode 117 are connected. Between the reference terminal r and the cathode terminal k of the shunt regulator 116, a phase compensating resistance 103 and a capacitor 104 are connected.

In the shunt regulator 116, assuming that a combined resistance value of the first voltage dividing resistance unit R1 connected to the reference terminal (the voltage comparing input terminal) r is R1, a combined resistance value of the second voltage dividing resistance unit R2 is R2, and an inner reference voltage source (the Zener diode) of the shunt regulator is Vref (for instance, 2.5 V), an output charging voltage V adjusted by the function of the shunt regulator 116 is expressed by V≈Vref*(1+R1/R2). Accordingly, a voltage dividing ratio R1/R2 is varied, so that a charging voltage Vo can be adjusted.

(Setting Circuit E2 of Charging Voltage by the Number of Cells)

According to this embodiment, the charging voltage is adjusted so as to meet the difference of the number of cells of the battery pack 2 to be charged by varying the combined resistance value (R2) of the second voltage dividing resistance unit R2. Namely, when the number of cells is large and the charging voltage is desired to be increased, the combined resistance value R2 is set to a smaller value. Accordingly, the resistance 106 forming the second voltage dividing resistance unit R2 is connected in parallel with the resistance 105 through a switching element (an N channel MOSFET) 118. Similarly, the resistance 109 is connected in parallel with the resistance 105 through a switching element 119 (an N channel MOSFET) 119. Further, the resistance 112 is connected in parallel with the resistance 105 through a switching element (an N channel MOSFET) 120. Gate terminals of the switching elements 118, 119 and 120 are respectively connected to the output port 51b of the microcomputer 50 through resistances 108, 111 and 114. To the gate terminals of the switching elements 118, 119 and 120, bias resistances 107, 110 and 113 are respectively connected.

The switching elements 118, 119 and 120 are selectively controlled to be turned on from a turned off state by a control signal of the microcomputer 50. The microcomputer 50 automatically takes in an output voltage of a voltage dividing circuit by the resistance 7 showing the number of cells and the cell number detecting resistance 9 from the input port 52 of the A/D converter to control the switching elements 118, 119 and 120 to be selectively turned on correspondingly to the number of cells.

For instance, a voltage dividing ratio R1/R2 determined by a series combined resistance value R1 of a resistance 101 and a potentiometer 102 and a resistance value R2 by the resistance 105 is set to a setting value of the lithium ion battery of "2 cells". A setting value R2 for charging the lithium ion battery of "3 cells" is set to a combined resistance value obtained by turning on the MOSFET (the switching element) 118 and connecting the resistance 106 in parallel with the resistance 105. Similarly, a setting value R2 for charging the lithium ion battery of "4 cells" is set to a combined resistance value by turning on the MOSFET 119 and connecting the resistance 109 in parallel with the resistance 105. Further, a setting value R2 for charging the lithium ion battery of "5 cells" is set to a combined resistance value obtained by turning on the MOSFET 120 and connecting the resistance 112 in parallel with the resistance 105. In such a way, according to the embodiment, the charging voltage is adjusted so as to meet the difference to the number of cells by varying the combined resistance value R2 of the second voltage dividing resistance unit R2.

(Mode Display Circuit 130)

A mode display circuit 130 includes a display unit 131 having a red LED (R) and a green LED (G) and current limiting resistances 132 and 133 of the LEDs respectively. The mode display circuit 130 displays the states of modes. For instance, a state "before a charging operation" is displayed by lighting only the red LED (R). A "charging state" is displayed by an orange color obtained when the red LED (R) and the green LED (G) are turned on at the same time. Further, a state "after a charging operation" is displayed by turning on only the green LED (G).

The structure of the above-described charging device 200 is common to the charging devices shown in FIGS. 1 and 2. However, in the charging device 200 considered in the course of studying the present invention as shown in FIG. 2, when the battery pack 2 is inserted into the charging device 200 and left as it is, below-described problems of an over-discharge arise.

That is, in the charging device 200 according to a usual technique as shown in FIG. 2, under a state that the charging device 200 is disconnected from an input ac power source 1 before or after a charging operation, that is, under a state that plugs 11 and 12 of the charging device 200 are pulled out from a plug socket or a socket as the ac power source 1, an anode terminal O1 and a cathode terminal O2 of a battery pack 2 are respectively inserted into an anode side output line L1 and a cathode side output line (a ground side line) L2 of the charging device 200, when the battery pack is left as it is for a long time, a resistance 33 forming a smoothing circuit part that is inserted between a pair of output lines L1 and L2 forms one discharging path relative to the battery pack 2. Similarly, a plurality of series resistances 101, 102 and 105 forming a charging voltage setting circuit part 100b also forms the other discharging path relative to the battery pack 2. Further, a plurality of series resistances 91 and 92 forming a battery voltage circuit part 90 also form a still other discharging path. Further, a problem arises that the voltage of the battery pack 2 is discharged through an inner circuit part of the shunt regulator 116 shown in FIG. 3. As a result, for instance, when the battery pack 2 is formed with a lithium ion secondary battery, a problem of a damage arises that an over-discharge state causes a short-circuit between the electrodes of the lithium ion secondary battery.

The present invention particularly intends to prevent the battery pack 2 from being discharged even when the battery pack 2 is left for a long time without being pulled out from the charging device 200 under a state that the input power terminals I1 and I2 of the charging device 200 are not connected to the ac power source 1. For this purpose, a discharge preventing circuit 170 according to the present invention is provided as shown in FIG. 1 in addition to a circuit structure shown in FIG. 2.

(Discharge Preventing Circuit 170)

As shown in FIG. 1, the discharge preventing circuit 170 includes a switching element 121 inserted between the component circuit parts of the discharging device 200 such as the resistance 33 (including the series resistance circuits 101, 102 and 105 and the series resistance circuits 91 and 92 for detecting the battery voltage as well as the resistance 33) and the anode side output line L1. The switching element 121 is formed with, for instance a P channel MOSFET. To the gate of the P channel MOSFET 121, a gate protecting Zener diode 127 for protecting a voltage resistance between the gate and a source and series connecting resistances 122 and 123 are connected. Further, the discharge preventing circuit 170 includes a switching element 124. The switching element 124 is formed with, for instance, an N channel MOSFET. The gate of the N channel MOSFET 124 is connected to a voltage dividing point by series resistances 125 and 126 and biased to a turned on state by the dc voltage source Vcc.

In the charging device 200 according to the present invention shown in FIG. 1, during an ordinary charging operation in which the input power terminals 11 and 12 are connected to the a power source 1, the constant voltage power circuit 40 supplies the dc voltage Vcc to a voltage dividing circuit (a bias circuit) composed of the series resistances 125 and 126. The N channel MOSFET 124 is turned on (a conductive state) by the dc voltage Vcc supplied to the series resistances 125 and 126. When the MOSFET 124 is turned on, to the gate of the P channel MOSFET 121, a voltage obtained by dividing a voltage V between the pair of the anode side output line L1 and the cathode side output line L2 by the series resistances 122 and 123 is applied as a gate voltage to turn on the MOSFET 121.

When the MOSFET 121 is turned on, the resistance 33, the plurality of series resistances 101, 102 and 105, the plurality of series resistances 91 and 92 forming the battery voltage circuit part 90 and the inner circuit part of the shunt regulator 16 are electrically connected to the anode side output line L1 through the MOSFET 121. Thus, as long as the charging device 200 is connected to the ac power source 1, the charging device 200 can carry out a normal charging operation. Namely, the rectifying and smoothing circuit 30 can smooth the prescribed charging voltage, a constant current value can be set by the charging current setting circuit 70 and a constant voltage value can be set by the charging voltage setting circuit 100*b*. FIG. 4 illustrates one example of characteristic views showing the time change of the battery voltage and the charging current obtained when the battery pack 2 of the lithium ion battery is charged by a constant current and constant voltage charging system in the charging device 200 according to the present invention shown in FIG. 1.

On the other had, before or after the battery pack 2 is charged by the charging device 200, when the battery pack 2 is connected to the charging device 200 and left as it is for a long time under a state that the plug (I1 and I2) of the charging device 200 is pulled out from the input ac power source (a plug socket or a socket) 1, since the constant voltage power circuit 40 does not output the dc voltage Vcc as soon as the plugs I1 and I2 of the charging device 200 are pulled out from the ac power source 1 in the present invention shown in FIG. 1, the dc voltage Vcc applied to the series resistances 125 and 126 becomes zero. Therefore, an on voltage is not supplied to the N channel MOSFET 124 to make the MOSFET 124 non-conductive (a turned off state) or to be interrupted.

Thus, since the current supplied to the series resistance circuits 122 and 123 is interrupted, the P channel MOSFET 121 is also made to be non-conductive or interrupted. Accordingly, the resistance 33, the plurality of series resistances 101, 102 and 105 forming the charging voltage setting circuit part 100*b*, the plurality of series resistances 91 and 92 forming the battery voltage circuit part 90 and the inner circuit part of the shunt regulator 116 are electrically disconnected or interrupted from the anode side output line L1 due to the non-conductive state of the MOSFET 121. That is, the component circuit parts (the discharging paths) of the charging device 200 such as the resistance 33 are separated from the anode terminal O1 of the battery pack 2.

As a result, the resistance 33, the plurality of series resistances 101, 102 and 105 forming the charging voltage setting circuit part 100*b*, the plurality of series resistances 91 and 92 forming the battery voltage circuit part 90 and the inner circuit part of the shunt regulator 116 do not form wasteful discharging circuits or discharging paths relative to the battery pack 2. That is, even when the charging device 200 is pulled out from the ac power source 1 after the charging operation and the battery pack 2 is left under a state that the battery pack 2 is connected to the charging device 200, since the P channel MOSFET 121 is made to be non-conductive, unnecessary charging paths are prevented from being formed relative to the battery pack 2. It is to be understood that the discharge preventing circuit 170 itself is formed so as not to form unnecessary discharging paths relative to the battery pack 2. Accordingly, even when the battery pack 2 is connected to the charging device 200 and left for a long time under this state, the over-discharge of the battery pack 2 can be prevented. Since the rectifying diode 31 is inserted into the secondary coil of the transformer 21 in such a direction as to block a discharging current of the battery pack 2, the secondary coil of the transformer 21 does not form a discharging path to the battery pack 2.

As apparent from the above-description of the embodiment, according to the present invention, the charging device can be provided that can prevent the over-discharge by a relatively simple circuit. In the above-described embodiment, as the secondary battery, the lithium ion battery employed, however, the present invention may be applied to a charging device for charging other kinds of secondary batteries such as a nickel cadmium battery. Further, as the switching element, the MOSFET is used, however, other semiconductor switching elements such as a bipolar transistor may be used as well as the MOSFET. Further, as described above, the switching element is inserted between the component circuit parts of the charging device forming the discharging paths and the anode side output line (the anode terminal of the battery pack), however, the switching element may be inserted between the component circuit parts and the cathode side output line (the cathode terminal of the battery pack).

The invention provided by the inventor is specifically described on the basis of the embodiment. However, the present invention is not limited to the above-described embodiment and various kinds of changes may be made within a scope without departing from the gist thereof.

What is claimed is:

1. A charging device having a protective switching element, the charging device comprising:
a pair of input power terminals to be connected to an AC power source;
a charging power circuit for producing a charging voltage to be applied to a battery;
a pair of output lines for supplying the charging voltage to the battery;
a component circuit part of the charging device connected by traversing a part between the pair of output lines;
a first switching element having a first terminal connected to one of the output lines and a second terminal connected to the component circuit part, the component circuit part being connected between the second terminal of the first switching element and the other of the output lines;
a second switching element connected across the battery to control on-off state of the first switching element;

a DC voltage power circuit for producing a DC voltage when the AC power source is connected to the pair of input power terminals, the DC voltage being applied to the second switching element to control on-off state of the first switching element, wherein:

both the first and second switching elements are turned ON when the AC power source is connected and are turned OFF when the AC power source is disconnected, and the first switching element is turned ON and OFF regardless of a magnitude of a battery voltage.

2. A charging device according to claim 1, wherein the first switching element is connected in series to the component circuit part so that the first switching element is changed from a conductive state to a non-conductive state when the input power terminals are not connected to the AC power source.

3. A charging device according to claim 2, wherein the component circuit part of the charging device is a discharging resistance circuit including a resistance element and the first switching element is connected in series to the discharging resistance circuit.

4. A charging device according to claim 2, wherein the component circuit part of the charging device is composed of a plurality of series resistance circuits connected in series and the first switching element is connected in series to the series resistance circuits.

5. A charging device according to claim 1, wherein the charging power circuit including a smoothing circuit having a capacitor and resistor, the resistor being connected between the second terminal of the first switching element and the other of the output lines.

6. A charging device according to claim 5, wherein the component circuit part of the charging device is a discharging resistance circuit including a resistance element and the first switching element is connected in series to the discharging resistance circuit.

7. A charging device according to claim 5, wherein the component circuit part of the charging device is composed of a plurality of series resistance circuits connected in series and the first switching element is connected in series to the series resistance circuits.

8. A charging device according to claim 1, wherein the charging voltage control circuit includes a shunt regulator for controlling the charging voltage, the shunt regulator being connected between the second terminal of the first switching element and the other of the output lines.

9. A charging device according to claim 8, wherein the component circuit part of the charging device is composed of a plurality of series resistance circuits connected in series and the first switching element is connected in series to the series resistance circuits.

10. A charging device according to claim 1, wherein the first switching element is formed with a semiconductor switching element.

11. A charging device according to claim 1, further comprising:

a rectifying and smoothing circuit for rectifying and smoothing the AC voltage of the AC power source; and a switching circuit for switching an output voltage of the rectifying and smoothing circuit to produce a high frequency AC voltage, wherein the high frequency AC voltage is rectified and smoothed to produce a DC voltage which is supplied to the battery.

12. A charging device according to claim 1, further comprising:

a primary side rectifying and smoothing circuit;

a switching circuit having a high frequency transformer; and a secondary side rectifying and smoothing circuit.

13. A charging device according to claim 12, wherein the primary side rectifying and smoothing circuit includes a full-wave rectifying circuit and a smoothing capacitor and is electrically connected to an AC power source through a pair of input power terminals to full-wave rectify the AC power source.

14. A charging device according to claim 13, wherein the switching circuit, having the high frequency transformer, further includes a MOSFET connected in series to a primary winding of the transformer and a PWMIC for modulating a pulse width of a driving pulse signal applied to a gate electrode of the MOSFET.

15. A charging device according to claim 1, wherein the battery to be charged comprises:

a heat sensitive element for detecting a temperature of the battery and outputting a signal based on the detection, and a protecting circuit for monitoring a voltage of each battery cell and outputting a signal when an over-charge or an over-discharge condition exists in the battery, wherein the charging device further comprises:

a battery voltage detecting circuit for detecting a voltage of the battery and outputting a signal based on the detection.

16. A charging device according to claim 15, further comprising:

a control circuit device which determines the temperature of the battery based on the signal output by the heat sensitive element, determines the voltage of the battery based on the signal output by the battery voltage detecting circuit and outputs a control signal to the charging device based on the determinations.

17. A charging device comprising:

a pair of input power terminals to be connected to an AC power source;

a charging power circuit for producing a charging voltage to be applied to a battery;

a pair of output lines for supplying the charging voltage to the battery;

a charging voltage control circuit including a charging voltage setting circuit having a first resistor and a second resistor connected in series to set the charging voltage;

a battery voltage detecting circuit including a third resistor and a fourth resistor connected in series to detect the battery voltage;

a discharge preventing circuit including a first switching element having a first terminal connected to one of the output lines and a second terminal, and a second switching element connected across the battery to control on-off state of the first switching element, wherein a first series circuit including the first and the second resistors and a second series circuit including the third and the fourth resistors are connected in parallel between the second terminal of the first switching element and the other of the output lines; and a DC voltage power circuit for producing a DC voltage when the AC power source is connected to the pair of input power terminals, the DC voltage being applied to the second switching element to control on-off state of the first switching element, wherein:

both the first and second switching elements are turned ON when the AC power source is connected and are turned OFF when the AC power source is disconnected, and the first switching element is turned ON and OFF regardless of a magnitude of a battery voltage.

18. A charging device according to claim 17, wherein the charging power circuit including a smoothing circuit having a capacitor and a fifth resistor, the fifth resistor being connected between the second terminal of the first switching element and the other of the output lines.

19. A charging device according to claim 17, wherein the charging voltage control circuit includes a shunt regulator for controlling the charging voltage, the shunt regulator being connected between the second terminal of the first switching element and the other of the output lines.

20. A charging device according to claim 17, wherein the first switching element is formed with a semiconductor switching element.

21. A charging device according to claim 17, further comprising:
- a rectifying and smoothing circuit for rectifying and smoothing the AC voltage of the AC power source; and
- a switching circuit for switching an output voltage of the rectifying and smoothing circuit to produce a high frequency AC voltage, wherein the high frequency AC voltage is rectified and smoothed to produce a DC voltage which is supplied to the battery.

* * * * *